United States Patent [19]

Yates et al.

[11] 4,179,269
[45] Dec. 18, 1979

[54] SYNTHETIC LOG PRODUCTION

[76] Inventors: Willard L. Yates, Rte. 1, Box 326 A, Parker City, Ind. 47368; Floyd W. Lee, Penz Dr., Oakwook, Ill. 61858

[21] Appl. No.: 896,023

[22] Filed: Apr. 12, 1978

[51] Int. Cl.² .............................................. C10L 5/00
[52] U.S. Cl. .................................. 44/10 B; 44/10 D; 44/24
[58] Field of Search ............ 44/10 R, 1 E, 1 G, 10 B, 44/10 G, 10 H, 10 D, 24

[56] References Cited

U.S. PATENT DOCUMENTS

| | | | |
|---|---|---|---|
| 1,851,689 | 3/1932 | Wolf | 44/10 H |
| 2,164,933 | 7/1939 | Maurel | 44/10 R |
| 2,842,431 | 7/1958 | Robertson | 44/24 |
| 3,173,769 | 3/1965 | Martin et al. | 44/6 |
| 3,297,419 | 1/1967 | Eyre, Jr. | 44/6 |
| 3,637,355 | 1/1972 | Brockbank | 44/1 R |
| 3,726,651 | 4/1973 | Ronden | 44/14 |
| 4,042,343 | 8/1977 | Bernard | 44/10 B |
| 4,046,518 | 9/1977 | Dalzell | 44/10 B |
| 4,062,655 | 12/1977 | Brockbank | 44/6 |

Primary Examiner—Carl Dees
Attorney, Agent, or Firm—Cushman, Darby & Cushman

[57] ABSTRACT

A method of making synthetic fireplace logs or the like, and the logs so produced. Approximately 55–80% by weight of ground coal is mixed with approximately 0–10% by weight of wood fiber material at room temperature, and approximately 20–35% of melted slack wax is added to the coal-wood mixture so that a putty-like, extrudable, mixture is formed. The mixture is fed into an extruder, the mixture being at substantially 80°–95° F., when fed to the extruder, and the mixture is extruded to produce cylindrical logs or the like. The extrusion is cut into lengths, and the logs are rolled in a flame coloring agent, wrapped, and are ready for shipping.

21 Claims, 2 Drawing Figures

SYNTHETIC LOG PRODUCTION

BACKGROUND AND SUMMARY OF THE INVENTION

The invention relates to a method of producing inexpensive fireplace logs or the like, and the logs so produced. In the past, there have been various proposals for the construction of synthetic fireplace logs using coal, however, such prior art attempts often have not been commercially feasible since the logs so produced are difficult to make, cannot economically compete with synthetic wood logs, and/or are difficult to bind in satisfactory form. Prior art synthetic logs that do have satisfactory form include charcoal with the coal, and paraffin wax, both charcoal and paraffin wax being relatively expensive, and requiring mixing in a water medium, and application of vacuum pressure for dewatering, and a curing step.

According to the present invention, a coal log is produced having satisfactory form but being much less expensive than prior art logs since no charcoal or paraffin wax are required, and the log is produced by a simple method that does not require any watering, dewatering, and curing steps. According to the method of the present invention, a major portion of ground coal and a minor portion of relatively fine wood fiber material are mixed together substantially at room temperature, a minor portion of slack wax is heated to its melting temperature, and the melted slack wax is mixed with the coal and wood mixture so that a putty-like extrudable mixture is formed, and such mixture is extruded to produce cylindrical logs or the like. The use of slack wax results in a product that is capable of extrusion under ambient conditions, does not require watering, dewatering, and curing, and results in a product that while inexpensive, burns evenly and steadily. Slack wax remains flexible even after extrusion and hardening of the log, which allows construction of a log entirely of ground coal (or ground coal with wood fiber) that has the necessary form for use as a fireplace log or the like. The extrusion step is practiced substantially at 80° to 95° F., and unless the ambient temperature is very cold (i.e., 40° F.) the extrusion can be practiced without addition of extra heat, the mixture of wax, coal, and wood having the desired temperature from the addition of the melted wax alone to result in the extrusion of a log having the desired properties. The manufacture of the log can take place both by batch and continuous processes.

In order to provide a pleasing effect during burning, flame coloring agents may be added to the logs. For instance, the extruded log can be rolled in copper sulphate. Additionally, if necessary, conventional igniters can be added to the mixture to improve the ignition characteristics, conventional igniters including sodium nitrate, potassium nitrate, and potassium chloride.

According to the present invention, a fireplace log is produced consisting essentially of about 55 to 80% by weight of ground coal, approximately 20 to 35% by weight slack wax, and approximately 0 to 10% by weight of wood fiber material. The coal is ground, as opposed to powdered, and the wood fiber material is preferably selected from the group consisting of saw dust and wood shavings, lengthwise grain wood shavings (as opposed to cross-grain wood shavings) being most suitable.

It is the primary object of the present invention to provide a simplified method for the manufacture of synthetic fireplace logs or the like, and to provide an inexpensive fireplace log or the like having suitable characteristics for use as a fireplace log. This and other objects of the invention will become clear from an inspection of the detailed description of the invention, and from the appended claims.

DETAILED DESCRIPTION OF THE INVENTION

Figure 1:
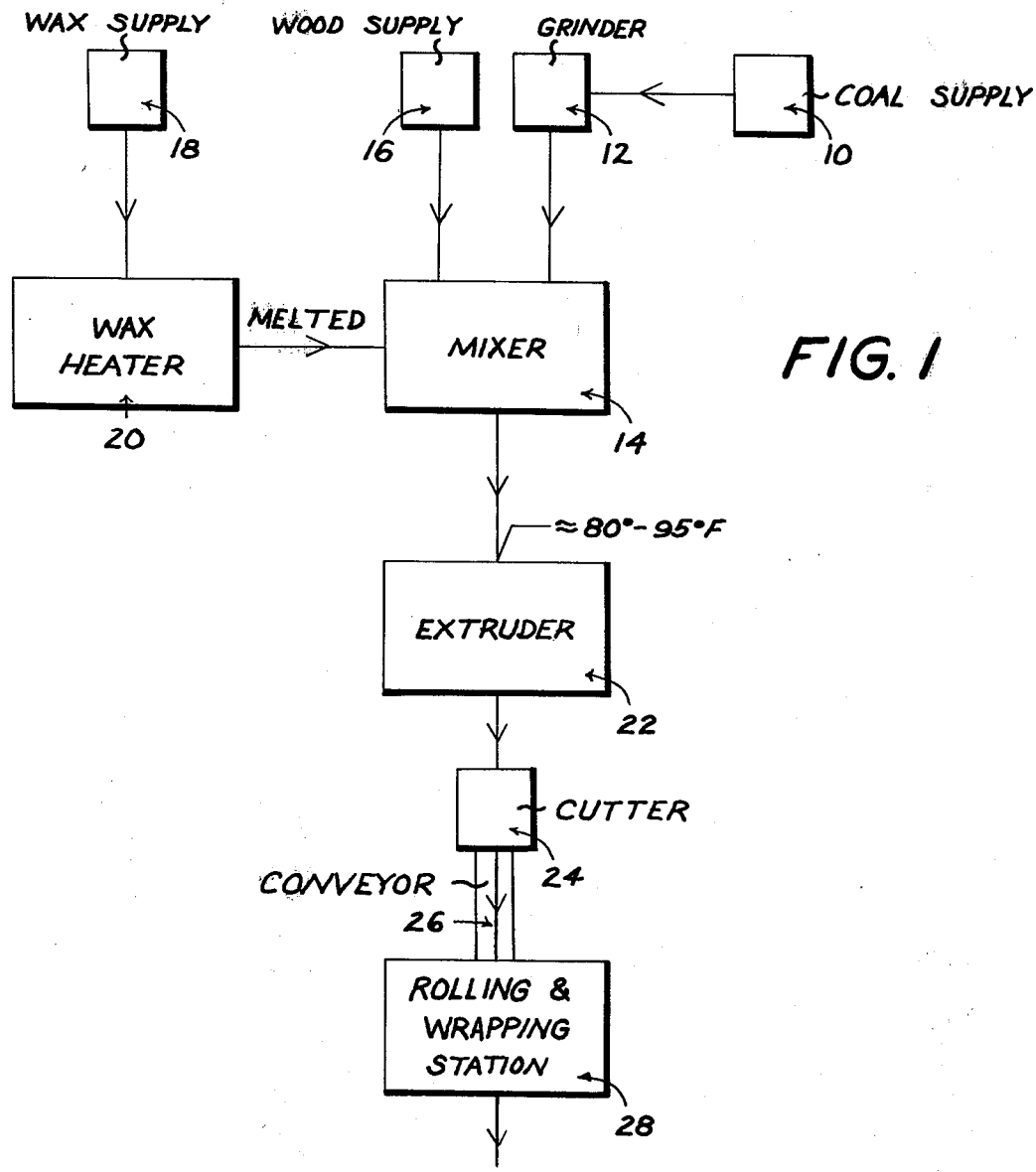
FIG. 1 is a schematic flow diagram illustrating an exemplary manner for the production of fireplace logs according to the present invention.

Reference is directed to FIG. 1 which schematically illustrates an exemplary manner of producing fireplace logs or the like according to the present invention. Coal from a coal supply 10 is passed through a grinder 12, and deposited in a mixer 14, either on a batch or continuous basis. Wood fiber material is also added to the mixer 14 from a wood supply 16. A suitable grinder that may be utilized is Hammermill Model #3033 of Iowa Manuf. Co., Cedar Rapids, IA, and the mixer 14 may be any conventional type that achieves thorough mixing, and is capable of temperature control, if necessary. Petroleum based wax, particularly slack wax, is passed from a supply 18 to a heater 20 wherein the wax is heated to its melting point, and the melted wax is then passed to the mixer 14 and mixed with the ground coal and wood fiber material. For instance, the wax may be introduced into the mixer 14 by spray nozzles, mixing continuing during injection of the wax. Again, the wax may be added on a continuous or batch basis.

Unless ambient conditions are quite cold (i.e., 40° F.), it is normally not necessary to provide any additional heat to the putty-like extrudable mixture of wax, coal, and wood fiber material as it is passed into the extruder 22. Under normal ambient conditions, the extrudable mixture will have a temperature of approximately 80° to 95° F. at the entrance into the extruder, 90° F. being a preferred temperature at which to maintain the extruder should the ambient temperature be too low. At this temperature of the mixture, it is soup-like, and the wax has just started to harden. A suitable conventional extruder that is useful for practicing the invention is that manufactured by the Bonnet Company of Kent, Ohio.

Figure 2:
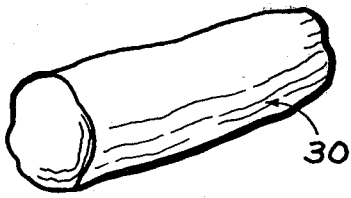
FIG. 2 is a perspective view of an exemplary log according to the invention.

After extrusion of the mixture of wax, coal, and wood fiber material, it is passed to a conventional cutter 24 or the like, and then conveyed by a conveyor 26 or the like to a station 28. At station 28, the cut logs may be rolled in a flame coloring agent, such as copper sulphate, and then the finished logs are wrapped and are ready for transport and/or use. An exemplary log 30 according to the present invention is illustrated schematically in FIG. 2, the log preferably having a diameter of about 3 to 4 inches, and a length of about 18 inches.

It is readily apparent that the method according to the present invention is extremely simple, and does not require any water mixing, dewatering, or curing steps, nor does it normally require any addition of heat to the mixture during extrusion, yet a log having satisfactory form and burning characteristics is produced.

The coal that is added to the mixture 14 after passing through the grinder 12 is ground coal, as opposed to powdered or lump coal, and the wood fiber material in the wood supply 16 is preferably selected from the group consisting of saw dust and wood shavings. Most effective are lengthwise grain wood shavings since such shavings have a good deal of complete wood fiber, resulting in better form and burning characteristics than saw dust or cross grain wood shavings. The addition of the wood fibers to the mixture is not critical, however, wood fibers regulate the weight of the logs so produced since they are bulky and light. According to the invention, the final log produced will have a coal content of about 55 to 80% by weight, and a wood fiber material content of about 0 to 10% by weight.

The petroleum based wax according to the present invention that allows the easy, inexpensive production of logs having satisfactory form and burn characteristics is conventional slack wax (sometimes referred to as slackchain wax). Table 1 below provides a capsule summary of the properties of slack waxes, especially as compared to paraffin wax. Slack wax is much less expensive than paraffin wax, yet has excellent properties for log production, always being semi-fluid even when hardened, and thus remaining flexible after hardening. Additionally, it burns very evenly and steadily. Two specific slack waxes that are utilizable according to the present invention are also listed in Table 1, these waxes including Quaker State IP-2, and Exxon Plasti-Crude.

Table 1.

| Physical Property | ASTM Method | Paraffin* Wax | Slack* Wax | Exxon** Plasti-Crude | Quaker State IP-2 |
|---|---|---|---|---|---|
| Melting Point °F. | D 87 | 124–137 | 108–120 | 121 | 115–118 |
| Hardness (penetration) at 25° C. (77° F.) | D 1321 | 10–20 | 50–80 | 77 | 61 |
| Oil Content, % | D 721 | 0.1–0.5 | 10–23 | 6.5 | 10 |
| Saybolt viscosity at 90° C. (210° F.), SUs | D 88 | 38–42 | 35–38 | 37.6 | 36–42 |
| Tensile strength, lb/in.$^2$ | D 1320 | 160–400 | 40–100 | — | — |
| Flash point, °F. | | — | — | 405° | 395 |

*Source - Encyclopedia of Polymer Service & Technology published by Interscience Publishers, Vol. 14, 0. 769, copyrighted 1971.
**Source - Manufacturer.

The following Examples are illustrative of the log production according to the present invention:

EXAMPLE 1

Ground coal and lengthwise grain wood shavings were mixed together at room temperature, and Quaker State IP-2 slack wax was heated to its melting point and added to the mixture containing coal and wood. The coal was 75% by weight, the wax 20% by weight, and the wood fiber material 5% by weight. The wax, coal, and wood were mixed to form a putty-like extrudable mixture, which was passed into a Bonnet Company extruder, without the addition of heat, the mixture at the point of introduction into the extruder being substantially at 90° F. The extrusion exiting the extruder had a temperature of approximately 85° F., the wax having hardened sufficiently so that the extrusion maintained its form. The extrusion was then cut, and the cut logs rolled in copper sulphate. The log so produced had good form and good burning characteristics, and was entirely suitable for use as a fireplace log.

EXAMPLE 2

Other logs were produced in the same manner as in Example 1 except that the mixture included 70% by weight coal, 28% by weight Quaker State IP-2, and 2% by weight of wood shavings. The logs so produced had excellent form and excellent burn characteristics and were eminently suitable as a fireplace log.

It will thus be seen that according to the present invention, a method of log production has been provided that is extremely simple and requires only relatively unsophisticated, commercially available equipment; also, according to the present invention, a fireplace log is produced that is inexpensive yet has form and burn characteristics that make it very suitable for use as a fireplace log.

While the invention has been herein shown and described in what is presently conceived to be the most practical and preferred and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of making fireplace logs or the like comprising the steps of
   mixing a major portion of ground coal and a minor portion of relatively fine wood fiber material,
   heating a minor portion of slack wax to its melting temperature,
   mixing the minor portion of melted wax with the major portion of ground coal and the minor portion of wood fiber material so that a putty-like, extrudable mixture is formed, and
   extruding the putty-like mixture to produce cylindrical logs or the like.

2. A method as recited in claim 1 wherein said extruding step is practiced substantially at 80°–95° F.

3. A method as recited in claim 1 comprising the further step of rolling the extruded log or the like in a flame coloring agent.

4. A method as recited in claim 3 wherein said flame coloring agent is copper sulphate.

5. A method as recited in claim 1 wherein said major part of coal is approximately 55–80% by weight, and wherein said minor part of slack wax is approximately 20–35% by weight, and wherein said minor part of wood fiber material is approximately 0–10% by weight.

6. A method as recited in claim 1 wherein said wood fiber material comprises lengthwise grain wood shavings.

7. A method of making fireplace logs or the like consisting of the steps of mixing a major portion of ground coal and a minor portion of relatively fine wood fiber material together at substantially room temperature, heating a minor portion of petroleum wax to its melting temperature, mixing the minor portion of melted wax with the mixture of coal and wood to form a putty-like extrudable mixture, extruding the putty-like mixture to form cylindrical logs or the like, and adding a flame coloring agent to the logs or the like.

8. A method as recited in claim 7 wherein said extruding step is practiced substantially at 80°–95° F.

9. A method as recited in claim 7 wherein said wax is slack wax and wherein said major part of coal is approximately 55–80% by weight, said minor part of slack wax is approximately 20–35% by weight, and said minor part of wood fiber material is approximately 0–10% by weight.

10. A method as recited in claim 7 wherein said wood fiber material is lengthwise grain wood shavings.

11. A method as recited in claim 7 wherein said flame coloring addition step is practiced by rolling extruded logs in copper sulphate.

12. A cylindrical fireplace log or the like consisting of a major portion of ground coal, a minor portion of relatively fine wood fiber material, a minor portion of slack wax, and a flame coloring agent.

13. A fireplace log or the like as recited in claim 12 wherein said major portion of coal comprises approximately 55–80% by weight, and wherein said minor portion of slack wax comprises approximately 20–35% by weight, and wherein said wood fiber material comprises approximately 0–10% by weight.

14. A fireplace log as recited in claim 12 wherein said relatively fine wood fiber material is selected from the group consisting of saw dust and wood shavings.

15. A fireplace log or the like as recited in claim 12 wherein said relatively fine wood fiber material is lengthwise grain wood shavings.

16. A fireplace log or the like consisting essentially of

55–80% by weight ground coal,

20–35% by weight slack wax, and

0–10% by weight wood fiber material.

17. A fireplace log or the like as recited in claim 16 wherein said wood fiber material is lengthwise grain wood shavings.

18. A fireplace log or the like as recited in claim 16 wherein said slack wax has an oil content of generally 6.5% and a melting point of about 121° F.

19. A fireplace log or the like as recited in claim 16 wherein said slack wax has an oil content of generally 10%, and a melting point of about 115°–118° F.

20. A fireplace log or the like as recited in claim 16, the log also including an igniter and a flame coloring agent.

21. A fireplace log or the like is recited in claim 16, wherein said wood fiber material comprises about 2–5% by weight.

* * * * *